Nov. 19, 1968  S. OLDAKOWSKI ET AL  3,411,606
MOBILE SUPPORT WITH A PLATFORM OF CHANGEABLE POSITION
MAINTAINED PARALLEL AT ANY POSITION
Filed May 9, 1966  3 Sheets-Sheet 1

United States Patent Office 3,411,606
Patented Nov. 19, 1968

3,411,606
MOBILE SUPPORT WITH A PLATFORM OF CHANGEABLE POSITION MAINTAINED PARALLEL AT ANY POSITION
Stefan Oldakowski and Wladyslaw Bortkiewicz, Warsaw, Poland, assignors to Centralne Biuro Konstrukcyjne Urzadzen Budowlanych, Warsaw, Poland
Filed May 9, 1966, Ser. No. 548,573
Claims priority, application Poland, May 10, 1965, 108,755
2 Claims. (Cl. 182—2)

The invention relates to a mobile support with a platform able to be changeably positioned maintained substantially parallel at its various positions in relation to the support, which is designed for operation as a universal stationary or mobile assembly mast, mounted on a truck or trailer, for safe, easy and convenient carrying out of repairs and installation work in remote or almost inaccessible places.

Devices for similar purposes are produced by various firms all over the world. The characteristic part of the lifting devices in question is a two-member articulated mast connected with a parallelogram rope or lever linkage permitting maintaining parallel positions of the working platform at its various positions in relation to the support.

The use in the hitherto known lifting devices of a two-member mast and of a device ensuring parallel positioning of the platform at its various positions does not ensure to the operator a free access to any point within the reach of the mast e.g. the work beneath the support level is limited to a small distance in relation to the reach and the works above or behind an obstacle cannot be reached, e.g. behind a bridge railing or on the opposite side of a machine.

The purpose of the present invention is to provide apparatus enabling assembly, finishing, repair and other work in less accessible locations above or beneath the level of the terrain.

The embodiment of the invention is shown on the accompanying drawings where FIG. 1 presents the device in a raised position permitting the operator to work below the roadway of a bridge or viaduct; FIG. 2 shows the device in a raised position permitting work inside a silo; FIG. 3 shows the construction of the articulation mechanisms of arms of a three-member mast together with mechanisms for changing the position of the working platform while maintaining mutual parallelism at its various positions; FIG. 3a is a cross-sectional view taken on line 3a—3a of FIG. 3; FIG. 4 and 4a show operation diagram of a straight-line mechanism for a working platform of a multi-member mast; FIG. 5 shows the device folded up in rest position for road transport.

The position of platform 1, shown in FIG. 1, convenient for maintenance and repair work of bridges is attained by rotating the support 2, on which hydraulic drive and controls are arranged, and by appropriate positioning of arms 3 of the lifting device in relation to each other. The rotation of support 2 and mutual displacement of arms 3 may be controlled by the operator from the platform 1 or from a control cab situated on the rotary support 2.

Figure 1:
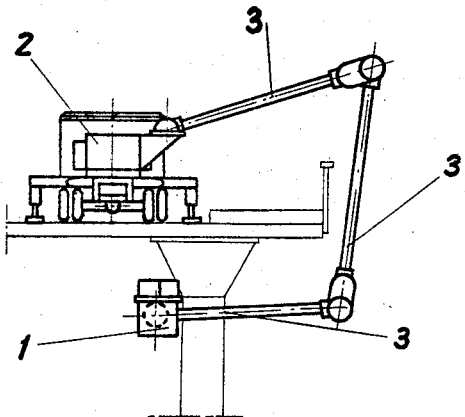
Figure 2:
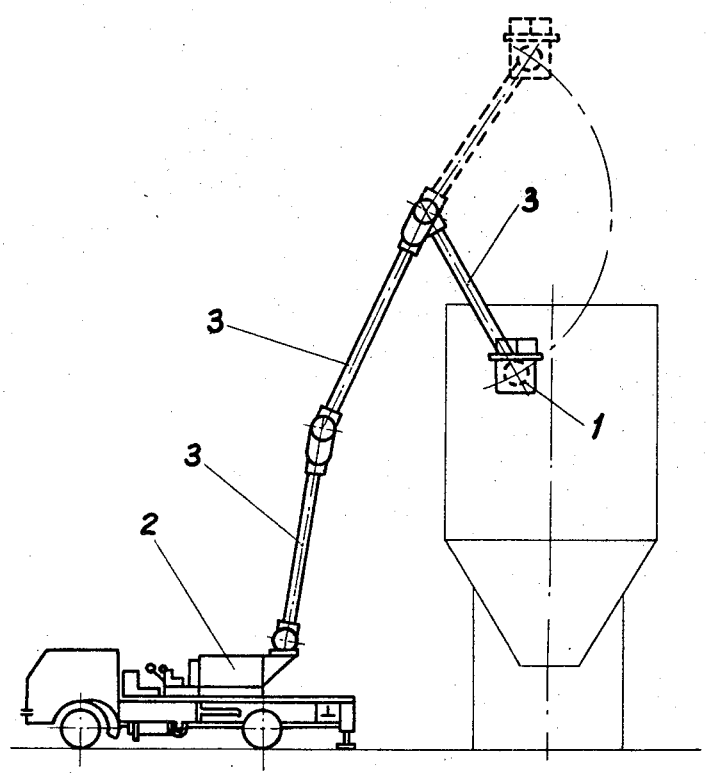
FIG. 2 shows another possible mutual positioning of arms 3 when maintenance or repair work is carried out inside of a silo or a tank.
Figure 3:
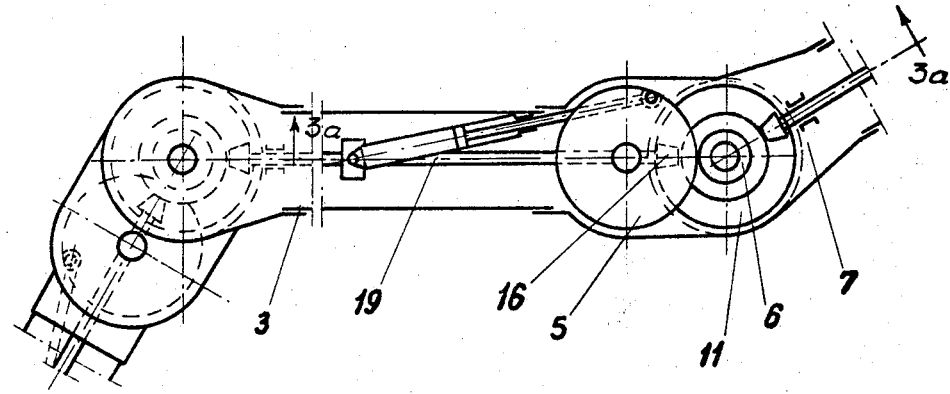
FIG. 3 and FIG. 3a show the construction of the articulation mechanism of a three-member mast which terminate the single arms 3 of the elevator.
Figure 3A:
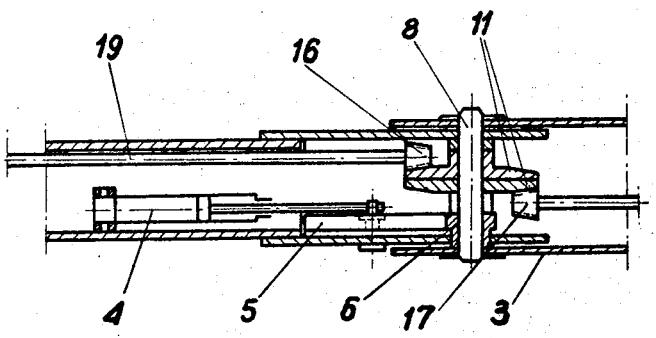

In the embodiment shown, for changing the positions of arms 3 in relation to each other, a hydraulic cylinder has been used which causes the rotation of gear wheel 5 engaged with gear wheel 6 fixed to head 7 of the next arm 3. Thus the rotation of engaged gear wheels 5 and 6 results in relative angular displacement of both arms 3 interconnected at the axis 8, permitting a movement of arms in relation to each other over an angle of approximately 360°.

Figure 4:
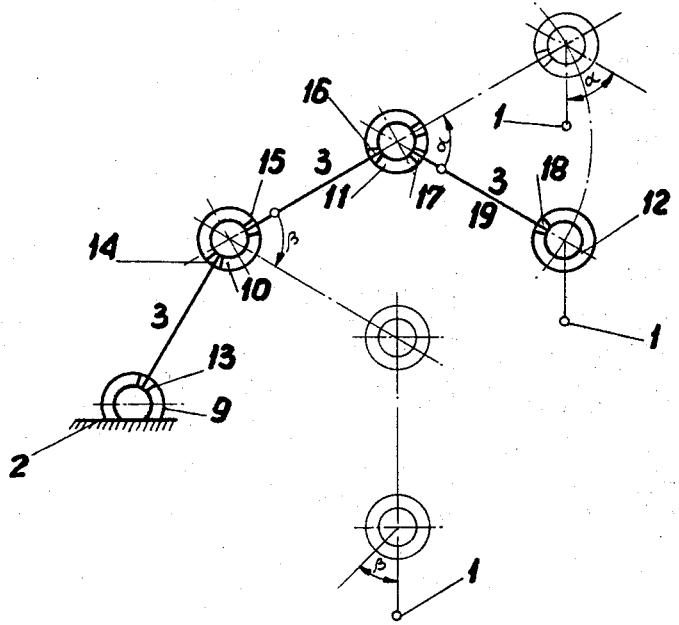
Figure 4A:
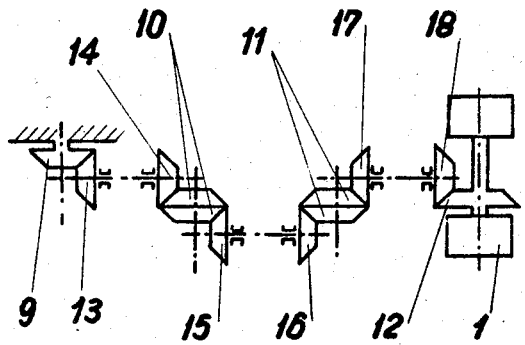

FIG. 4 and 4a show the diagrams of the mechanism which ensures parallel displacement of elements of the working platform. The mechanism consists of a bevel gear 9 fixed to rotary support 2, of gear wheels 10 and 11 rotatable on pivot pins of arms 3, and of gear wheel 12 fixed to the platform 1 freely suspended on a pin located in the head of upper arm 3. The above mentioned gear wheel 9, 10, 11 and 12, are engaged together by means of co-operating meshing bevel gears 13, 14, 15, 16, 17 and 18, fitted on shafts 19 pivotally supported in corresponding arms of the elevator. The operation of the mechanism ensuring parallel motion of the platform is clearly shown in FIG. 4. A rotation of the end arm 3 in any direction over an angle α when the remaining arms are in resting position results in the rolling of the gear wheel 17 over the same angle α. During this movement the wheel 17 and connected shaft 19, make certain strictly defined numbers of rotations determined by the ratio of gear wheels 11 and 17. On the other end of the shaft 19 there is fitted a bevel gear 18, the rotation of which causes rotating of wheel 12 together with platform 1 in a direction opposite that of rotation of arm 3 over the angle α and the platform 1 maintains parallel position in relation to the initial position, platform 1 being fixed to wheel 12.

In the same way rotation of any arm 3 over an angle α causes rotation of platform 1 over the same angle β and maintains it parallel with respect to the initial position.

In similar manner for simultaneous movements of all arms of the platform, its parallel position will not change. The above described mechanisms allow the rotation of arms in relation to each other over an angle of approximately 360°.

Figure 5:
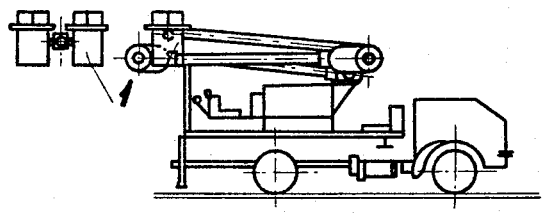

FIG. 5 shows the mobile support folded up in rest position for road transport. Folding up the device to the position shown is accomplished because the arms 3 can change their angular position with respect to each other in a range equal to approximately 360°.

What we claim is:
1. A mobile support comprising:
a support rotatable about a vertical axis;
a first arm pivoted to said support on a horizontal axis,
 a second arm pivoted to the end of said first arm and a third arm pivoted to the end of said second arm about axes parallel to said horizontal axis;
a platform pivoted to the end of said third arm on an axis parallel to said horizontal axis;
motive means on one said arm;
means driven by said motive means and operatively connected with the next said arm for rotating said next arm through substantially 360 degrees relative to said one arm, comprising a first gear rotatably carried by a said arm and a second gear of smaller diameter than said first gear and in mesh therewith fixed to a second said arm;
and means responsive to the rotative movement of any said arm to maintain said platform in a predetermined orientation through the said rotation of the said arm.

2. A mobile support comprising:
a support rotatable about a vertical axis;
a first arm pivoted to said support on a horizontal axis,
 a second arm pivoted to the end of said first arm and a third arm pivoted to the end of said second arm about axes parallel to said horizontal axis;

a platform pivoted to the end of said third arm on an axis parallel to said horizontal axis;
motive means on one said arm;
means driven by said motive means and operatively connected with the next said arm for rotating said next arm through substantially 360 degrees relative to said one arm;
and means responsive to the rotative movement of any said arm to maintain said platform in a predetermined orientation through the said rotation of the said arm;
two said arms being connected by a pivot pin, said last mentioned means comprising a first bevel gear rotatably mounted on said pivot pin, a shaft extending along a said arm, and a second bevel gear fixed to said shaft and meshing with said first bevel gear.

References Cited

UNITED STATES PATENTS

| | | | |
|---|---|---|---|
| 2,500,815 | 3/1950 | Gerli et al. | 182—2 |
| 2,616,768 | 11/1952 | Stemm | 182—2 |
| 2,881,030 | 4/1959 | Toche | 182—2 |
| 3,082,842 | 3/1963 | Balogh | 182—2 |
| 3,108,656 | 10/1963 | Asplundh | 182—2 |

FOREIGN PATENTS

| | | |
|---|---|---|
| 1,101,852 | 4/1955 | France. |
| 25,313 | 5/1963 | Germany. |
| 846,399 | 8/1960 | Great Britain. |

REINALDO P. MACHADO, *Primary Examiner.*